United States Patent [19]

Kubota et al.

[11] 4,241,139
[45] Dec. 23, 1980

[54] MAGNETIC RECORDING MEDIUM

[75] Inventors: Yuichi Kubota; Tsunayoshi Saito; Yoshiaki Makino, all of Tokyo, Japan

[73] Assignees: TDK Electronics Co., Ltd.; Tokyo Magnetic Printing Co., Ltd., both of Tokyo, Japan

[21] Appl. No.: 27,304

[22] Filed: Apr. 5, 1979

[30] Foreign Application Priority Data

Apr. 19, 1978 [JP] Japan ................................ 53/46053

[51] Int. Cl.$^2$ ............................................. H01F 10/02
[52] U.S. Cl. ................................... 428/413; 428/480; 428/506; 428/521; 428/522; 428/900; 428/423.7; 428/425.9; 428/423.3; 428/423.1
[58] Field of Search ................ 427/131, 130; 428/900, 428/413, 425, 480, 506, 521, 522

[56] References Cited

U.S. PATENT DOCUMENTS

| | | | |
|---|---|---|---|
| 3,466,156 | 9/1969 | Peters et al. | 427/131 |
| 4,075,384 | 2/1978 | Suzuki et al. | 428/900 |

*Primary Examiner*—Bernard D. Pianalto
*Attorney, Agent, or Firm*—Oblon, Fisher, Spivak, McClelland & Maier

[57] ABSTRACT

A magnetic recording medium which has a protective layer on a magnetic recording layer coated on a substrate and said protective layer comprises polyurethane and nitrocellulose in which isopropyl alcohol originally present has been replaced by a resin selected from the group consisting of polyurethane resins, polybutadiene resins, butadiene-acrylonitrile copolymers, vinyl chloride-vinyl acetate-vinyl alcohol copolymers, vinyl chloride-vinyl acetate copolymers, vinyl chloride-vinylidene chloride copolymers, vinylidene chloride-acrylonitrile-copolymers, vinyl acetate resins, epoxy resins, phenoxy resins, polyvinylbutyral resins, polyvinyl formal resins and polyester resins.

5 Claims, 1 Drawing Figure

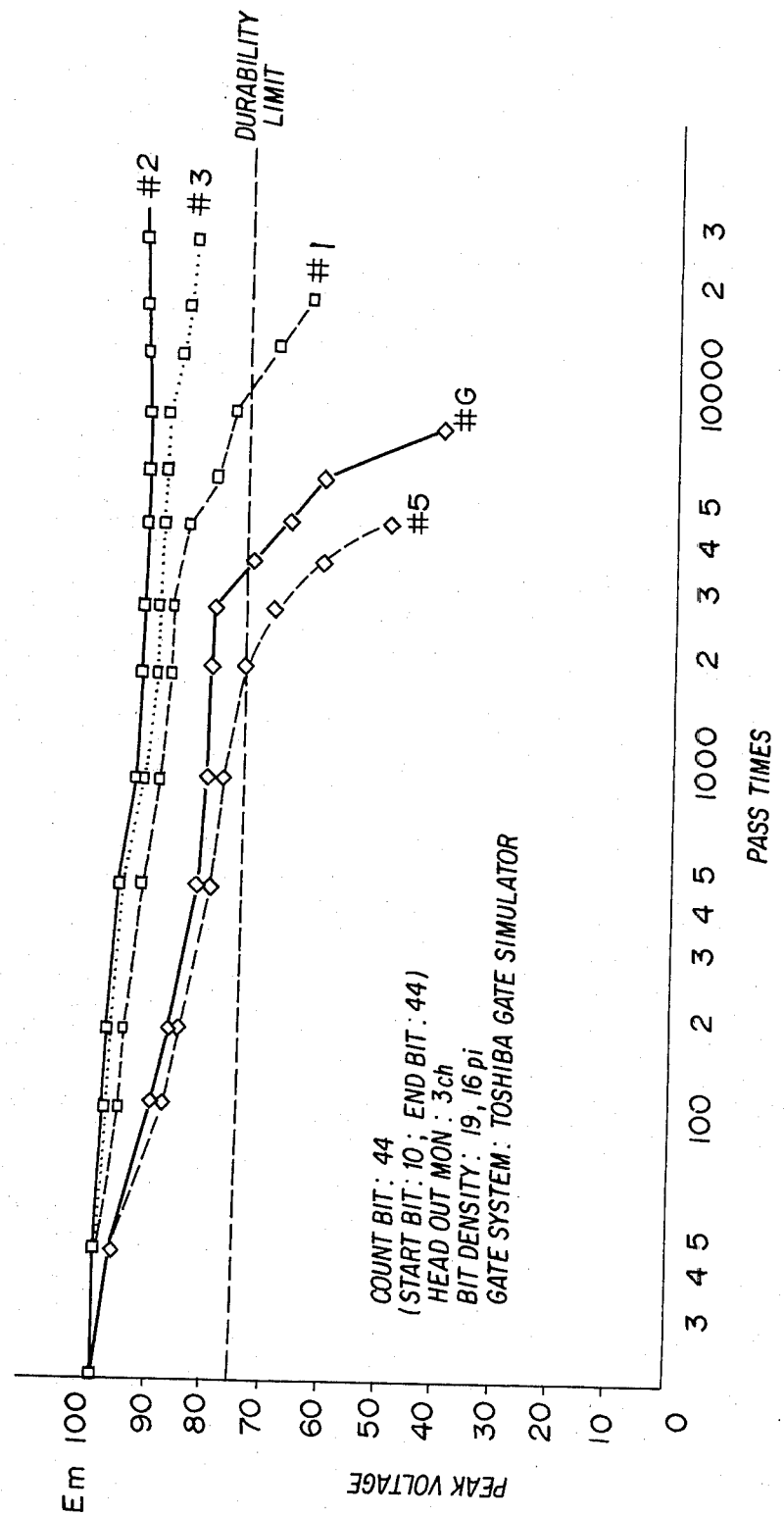

MAGNETIC RECORDING MEDIUM

BACKGROUND OF THE INVENTION

The present invention relates to magnetic recording media.

Various systems using a magnetic recording medium such as a magnetic card, a magnetic sheet and a magnetic disc have been remarkably developed.

However, it has not been attained to obtain a magnetic recording medium which is satisfactory from the viewpoints of reliability under a variation of an environment condition or reliability for durability under repeated applications.

SUMMARY OF THE INVENTION

It is an object of the present invention to provide a magnetic recording medium having satisfactory reliability under a variation of an environmental condition or reliability for durability under repeated applications.

It is another object of the present invention to provide a magnetic recording medium which has a specific protective layer on a magnetic recording layer to impart high reliability.

The foregoing and other objects of the present invention have been attained by providing a magnetic recording medium which has a protective layer on a magnetic recording layer coated on a substrate wherein said protective coated layer comprises polyurethane and nitrocellulose in which isopropyl alcohol originally present has been replaced by a resin selected from the group consisting of polyurethane resins, polybutadiene resins, butadiene-acrylonitrile copolymers, vinyl chloride-vinyl acetate-vinyl alcohol copolymers, vinyl chloride-vinyl acetate copolymers, vinyl chloride-vinylidene chloride copolymers, vinylidene chloride-acrylonitrile copolymers, vinyl acetate resins, epoxy resins, phenoxy resins, polyvinylbutyral resins, polyvinyl formal resins and polyester resins.

The magnetic recording medium of the present invention can be prepared by forming a magnetic recording layer on a substrate such as a polyester film and then, forming a protective layer on the surface of the magnetic recording layer by coating a lacquer comprising polyurethane and nitrocellulose in which isopropyl alcohol originally present has been replaced by a resin such as vinyl chloride-vinyl acetate-vinyl alcohol copolymer dissolved in a solvent such as methyl ethyl ketone tetrahydrofuran and toluene.

The resins used for replacing isopropyl alcohol which is originally incorporated in nitrocellulose can be polyurethane resins, polybutadiene resins, butadiene-acrylonitrile copolymers, vinyl chloride-vinyl acetate-vinyl alcohol copolymers, vinyl chloride-vinyl acetate copolymers, vinyl chloride-vinylidene chloride copolymers, vinylidene chloride-acrylonitrile copolymers, vinyl acetate resins, epoxy resins, phenoxy resins, polyvinylbutyral resins, polyvinyl formal resins and polyester resins. A ratio of the modified nitrocellulose to the polyurethane is preferably 9:1 to 2:8.

The resins are dissolved in suitable solvent to form a lacquer which can be coated at a desired thickness. A concentration of the resins in the lacquer is preferably 5 to 30 wt.% especially about 15 wt.%. The coating can be carried out by a conventional coater such as gravure printing machine, doctor knife, and reverse rolls. A thickness of a dried protective layer is preferably 0.1 to $100\mu$ especially about $2\mu$.

Suitable polyurethanes include polyurethanes obtained by reacting an isocyanate such as diphenylmethane diisocyanate, toluene diisocyanate, hexamethylene diisocyanate, dimicrohexyl methane diisocyanate and isophorone diisocyanate with a polyester polyol obtained by condensing a polyhydric alcohol such as ethyleneglycol, diethyleneglycol, propyleneglycol, 1,4-butanediol, 1,6-hexanediol and neopentylglycol with a dibasic carboxylic acid such as adipic acid; a polyether such as polypropyleneglycol and polytetraethyleneglycol; a polyol or a caprolactum type polyol, as a basic component.

When high durability is required, it is preferable to apply a crosslinking agent such as trifunctional isocyanates such as Desmodule L(Bayer Co.) Colonate L and Colonate HL (Nippon Polyurethane K.K.) Adiplene LD-213 (DuPont) or polyurethanes having terminal isocyanate groups or butylated melamine resins butylated urea resins or benzoguanamine at a ratio of 0.5 to 40 wt.% based on a total of the modified nitrocellulose and the polyurethane.

The lacquer is coated on the magnetic layer of the magnetic substrate and heated at suitable temperature such as 80° C. for suitable time each as 2 hours to crosslink the resins so as to form the protective layer.

When the crosslinking agent such as the isocyanate compound, the polyurethane having isocyanate group, butylated melamine resin, butylated area resin and benzoguanamine is reacted with the protective layer, it is possible to coat the crosslinking agent on the magnetic layer and to coat the protective layer on the crosslinking layer. It is also possible to coat the protective layer on the magnetic layer and to coat the crosslinking agent on the protective layer. The crosslinking agent is usually coated in a form of a solution and is crosslinked at suitable temperature such as 80° C. for suitable time such as 24 hours.

The crosslinking agent can be incorporated in a magnetic coating composition for the magnetic layer or in a lacquer for the protective layer.

It is preferable to incorporate 0.1 to 10 wt.% of a silicone oil based on resins.

Silicone oils used as an additive include dimethyl polysiloxane type oils; silicone oils modified with an aliphatic acid, an aliphatic alcohol or a surfactant; fluorinated oils; straight chain higher fatty acids or higher fatty alcohols (preferably having 14 or more of carbon atoms); and compounds having lubricating effect which are obtained by substituting carboxylic group of said acid with anine or amide group.

EXAMPLE 1

Lecithin: 2 wt. parts
Vinyl chloride-vinyl acetate-vinyl alcohol copolymer (VAGH manufactured by UCC): 20 wt. parts
Polyurethane resin (Esten 5701 manufactured by B. F. Goodrich Co.): 10 wt. parts
Methyl ethyl ketone (MEK): 250 wt. parts
Tetrahydrofuran (THF): 100 wt. parts The above-mentioned resins, additive and solvents were mixed in a mixer to dissolve the solid components. The paste was charged into a ball mill together with 120 wt. parts of $\gamma$-$Fe_2O_3$ (major axis of $0.8\mu$; minor axis of $0.2\mu$) and the mixture was stirred for 42 hours to disperse the magnetic powder. After the dispersion, 5 wt. parts of an isocyanate compound (Desmodule L) reactive with hydroxyl groups of the binder was charged into the resulting magnetic coating composition and the mixture was stirred in a mixer. The resulting magnetic coating composition was coated on a polyethyleneterephthalate film having a thickness of 188μ and the surface was treated and smoothened and then, the coated film was kept at 80° C. for 24 hours to accelerate a crosslinking reaction. The resulting coated film was used as a magnetic substrate for a magnetic card (sealess periodic ticket).

Nitrocellulose chips (H-½ second) (30% of isopropyl alcohol was replaced to 30% of vinyl chloride-vinyl acetate copolymer: 70% nitrocellulose): 10 wt. parts
Polyurethane resin (Esten 5702 manufactured by B. F. Goodrich Co.): 5 wt. parts
Silicone oil: 0.15 wt. part The components were dissolved in a solvent mixture of 50 wt. parts of MEK and 35 wt. parts of THF to prepare a lacquer having a concentration of 15 wt.%. The lacquer was coated on the magnetic layer of the magnetic substrate and dried to form a protective layer having a thickness of 2μ and the coated product was kept at 80° C. for 24 hours. This product was cut in a size of a sealess periodic ticket. This is shown as the Sample No. 1.

EXAMPLE 2

Trifunctional isocyanate compound (Desmodule L) was added at a ratio of 1.5 wt.% based on the total of the nitrocellulose chips (replaced) and the polyurethane resin in the 15 wt.% lacquer of Example 1. The mixture was mixed and coated on the magnetic layer of the magnetic substrate of Example 1 and dried to form a protective layer having a thickness of 2μ and the coated product was kept at 80° C. for 24 hours. This product was cut in a size of a sealess periodic ticket. This is shown as the Sample No. 2.

EXAMPLE 3

Nitrocellulose chips (H-½ second) (30% of isopropyl alcohol was replaced to 30% of polyurethane resin) (Esten 5703 manufactured by B. G. Goodrich Co.; 70% nitrocellulose): 11 wt. parts.
Polyurethane resin (Nippolan 5033 manufactured by Nippon Polyurethane Co.): 3.5 wt. parts. Aliphatic acid modified silicone oil: 0.15 wt. part The components were dissolved in a solvent mixture of 50 wt. parts of MEK and 35 wt. parts of THF to prepare a lacquer having a concentration of 15 wt.%. The lacquer was coated on the magnetic layer of the magnetic substrate of Example 1 and dried to form a protective layer having a thickness of 2μ and the product was kept at 80° C. for 24 hours and cut in a size of a sealess periodic thicket. This is shown as the Sample No. 3.

REFERENCE 1

Nitrocellulose chips (H-½ second) (containing 30% of isopropyl alcohol): 14.5 wt. parts Polyurethane resin (Esten 5702): 5 wt. parts Silicone oil: 0.15 wt. part The components were dissolved in a solvent mixture of 50 wt. parts of MEK and 35 wt. parts of THF to prepare a lacquer having a concentration of 15 wt.% and 1.5 wt. parts of trifunctional isocyanate compound (Desmodule L) was dissolved in the lacquer and the mixture was coated on the magnetic layer of the magnetic substrate of Example 1 and dried to form a protective layer having a thickness of 2μ and the product was kept at 80° C. for 24 hours and cut in a size of a sealess periodic ticket. This is shown as the Sample No. 5.

REFERENCE 2

In accordance with the process of Reference 1 except using nitrocellulose chips (H-½ second 30% of isopropyl alcohol was replaced to 30% of dibutyl phthalate 70% nitrocellulose) instead of the nitrocellulose containing isopropyl alcohol, a protective layer was formed to prepare a sealess periodic ticket. This is shown as the Sample No. G.

The sealess periodic tickets prepared in the examples and the references, were tested on the durability of the protective layers thereof by an automatic ticket watching machine gate simulator. The results are shown in The FIGURE wherein the ordinate shows an attenuation ratio of a peak voltage of reproduction output after repeatedly passing the periodic ticket to the peak voltage of reproduction output at the initiation as 100%. When the peak voltage of reproduction output is decreased for 25% of the rated output voltage, it is considered as the life of the sealess periodic ticket.

The peak voltage Em of the reproduction output after repeatedly passing for maximum of 3000 times was studied.

The reduction of the reproduction output was minimum in the case of Sample No. 2. The peak voltage Em is reduced for greater than 25% by passing 2000 to 3000 times in the cases of Samples No. 5 and No. G having nitrocellulose-polyurethane protective layer as References. This phexomenon is considered as follows. When isopropyl alcohol originally incorporated in nitrocellulose is replayed by a vinyl chloride-vinyl acetate-vinyl alcohol copolymer, the isocyanate compound effectively crosslinks with active hydroxyl groups in nitrocellulose, polyurethane, vinyl chloride-vinyl acetate-vinyl alcohol copolymer whereby a protective layer having excellent mechanical strength and low friction coefficient.

When isopropyl alcohol in nitrocellulose is not replayed as Sample No. 3, the isocyanate is reacted with isopropyl alcohol and is not effectively used for a crosslinking reaction with the nitrocellulose or the polyurethane. Moreover, a low molecular urethane compound is formed as a tacky component by reacting the isocyanate with isopropyl alcohol whereby the friction on the protective layer is increased.

When isopropyl alcohol in the nitrocellulose is replayed by dibutyl phthalate as Sample No. G, the hardness of the protective layer is improved but dibutyl phthalate in the nitrocellulose is migrated on the surface of the protective layer by the crosslinkage of the protective layer. The phthalic acid type plasticizer such as dibutyl phthalate has not effect for reducing friction or improving abrassion resistance whereby the slip characteristic may be deteriorated.

When the isocyanate is not used for the crosslinking as Sample No. 1, the protective layer is formed by uniformly blending the nitrocellulose, the vinyl chloride-vinyl acetate copolymer and the polyurethane, and the Sample No. 1 can be used for passing less than 1000 times. However, it is inferior to Sample No. 2 having an isocyanate crosslinked protective layer.

The crosslinking with butylated melamine as Sample No. 3 also effective in certain degree.

In the durability test by the gate simulator which requires to pass for a minimum of 3000 times, the protective layers of the Samples No. G and No. 5 were peeled off to cause damages of the magnetic layer. However, the protective layer of the Sample No. 1 was remained after passing for 2000 times and no abrasion of the protective layer of the Sample No. 2 was found after passing for 3000 times.

In the examples and references, the tests of the sealess periodic tickets have been illustrated. Thus, the present invention can be applied for preparing various magnetic recording media such as magnetic cards for minicomputer outer memory, banking cards, and sonosheets.

BRIEF DESCRIPTION OF THE DRAWING

The FIGURE is a characteristic cart for comparing characteristics of the magnetic recording media of the present invention and those of the references.

I claim:

1. A magnetic recording medium which comprises a protective layer coated on a magnetic recording layer which is coated on a substrate and said protective layer comprises polyurethane and nitrocellulose in which isopropyl alcohol originally present in the nitrocellulose has been replaced by a resin selected from the group consisting of polyurethane resins, polybutadiene resins, butadiene-acrylonitrile copolymers, vinyl chloride-vinyl acetate-vinyl alcohol copolymers, vinyl chloride-vinyl acetate copolymers, vinyl chloride-vinylidene chloride copolymers, vinylidene chloride-acrylonitrile copolymers, vinyl acetate resins, epoxy resins, phenoxy resins, polyvinylbutyral resins, polyvinyl formal resins and polyester resins.

2. A magnetic recording medium according to claim 1 wherein a crosslinking agent is incorporated in the protective layer or is coated on the magnetic layer or the protective layer before a final heat treatment.

3. A magnetic recording medium according to claim 2 wherein the crosslinking agent is a trifunctional isocyanate compound, a polyurethane having terminal isocyanate groups, a butylated melamine resin, a butylated urea resin or benzoguanamine.

4. A magnetic recording medium according to claim 2 wherein the crosslinking agent is incorporated at a ratio of 0.5 to 40 wt.% based on a total of the modified nitrocellulose and the polyurethane.

5. A magnetic recording medium according to claim 1 wherein isopropyl alcohol in the nitrocellulose is replaced by a vinyl chloride-vinyl acetate-vinyl alcohol copolymer or a polyurethane and the modified nitrocellulose and a polyurethane are dissolved in a solvent to form a lacquer for production of the protective layer.

* * * * *